United States Patent
Katsumata

(10) Patent No.: US 10,408,177 B2
(45) Date of Patent: Sep. 10, 2019

(54) STEEL FUEL CONVEYING PIPE

(71) Applicant: USUI KOKUSAI SANGYO KAISHA LIMITED, Shimizu-cho, Sunto-gun, Shizuoka (JP)

(72) Inventor: Aki Katsumata, Shimizu-cho (JP)

(73) Assignee: USUI KOKUSAI SANGYO KAISHA LIMITED, Shimizu-cho, Sunto-gun (JP)

(*) Notice: Subject to any disclaimer, the term of this patent is extended or adjusted under 35 U.S.C. 154(b) by 0 days.

(21) Appl. No.: 14/915,665

(22) PCT Filed: Sep. 2, 2014

(86) PCT No.: PCT/JP2014/073066
§ 371 (c)(1),
(2) Date: Mar. 1, 2016

(87) PCT Pub. No.: WO2015/037477
PCT Pub. Date: Mar. 19, 2015

(65) Prior Publication Data
US 2016/0230725 A1     Aug. 11, 2016

(30) Foreign Application Priority Data

Sep. 10, 2013   (JP) ................. 2013-187502

(51) Int. Cl.
*F02M 55/00*  (2006.01)
*F16L 9/02*   (2006.01)
(Continued)

(52) U.S. Cl.
CPC .......... *F02M 55/02* (2013.01); *F02M 55/004* (2013.01); *F02M 55/005* (2013.01);
(Continued)

(58) Field of Classification Search
CPC ..... F02M 55/02; F02M 55/004; F02M 55/005
(Continued)

(56) References Cited

U.S. PATENT DOCUMENTS

| | | | |
|---|---|---|---|
| 5,587,248 A | 12/1996 | Ohmura et al. | |
| 7,204,234 B2 * | 4/2007 | Morita | F02M 55/02 123/468 |

(Continued)

FOREIGN PATENT DOCUMENTS

| | | |
|---|---|---|
| JP | 6-2104 | 1/1994 |
| JP | 2002-54354 | 2/2002 |

(Continued)

OTHER PUBLICATIONS

JP 2007-239025 with Machine Translation.*
International Search Report.

*Primary Examiner* — Vishal Pancholi
(74) *Attorney, Agent, or Firm* — Gerald E. Hespos; Michael J. Porco; Matthew T. Hespos

(57) ABSTRACT

Provided is a steel fuel conveying pipe with high quality which has high resistance to corrosive fuel and followability, and allows working after plating. The steel fuel conveying pipe is characterized in that a Ni-plate layer is formed on an inner surface of a steel pipe of base material, the Ni-plated layer is wholly composed of a mutual diffusion layer including the base material and Ni and a non-mutual diffusion layer including only Ni formed on an outermost surface of the diffusion layer, a layer thickness of the non-mutual diffusion layer is 3 μm or more, and a total layer thickness of the mutual diffusion layer and the non-mutual diffusion layer is 10 μm or more and 25 μm or less.

2 Claims, 2 Drawing Sheets

(51) Int. Cl.
    *F16L 19/028*    (2006.01)
    *F16L 19/02*     (2006.01)
    *F02M 55/02*     (2006.01)

(52) U.S. Cl.
    CPC ............... *F16L 9/02* (2013.01); *F16L 19/028* (2013.01); *F16L 19/0243* (2013.01); *F02M 2200/05* (2013.01); *F02M 2200/16* (2013.01); *F02M 2200/9038* (2013.01); *F02M 2200/9046* (2013.01); *F02M 2200/9053* (2013.01); *F02M 2200/9076* (2013.01)

(58) Field of Classification Search
    USPC ........................................ 138/143, 145, 146
    See application file for complete search history.

(56) References Cited

U.S. PATENT DOCUMENTS

| | | | |
|---|---|---|---|
| 7,275,521 B2 * | 10/2007 | Usui | ................... F02M 55/005 123/468 |
| 2005/0284447 A1 | 12/2005 | Usui et al. | |
| 2013/0098496 A1 | 4/2013 | Takagi | |

FOREIGN PATENT DOCUMENTS

| | | |
|---|---|---|
| JP | 2006-152852 | 6/2006 |
| JP | 2006-194233 | 7/2006 |
| JP | 2007-77807 | 3/2007 |
| JP | 2007-239025 | 9/2007 |
| JP | 2012-26357 | 2/2012 |

* cited by examiner

STEEL FUEL CONVEYING PIPE

BACKGROUND

1. Field of the Invention

The present invention relates to a pipe for supplying fuel to an engine in a gasoline direct-injection engine system or a diesel engine system, and in particular to a pipe having resistance to inferior fuel containing a corrosive component.

2. Description of the Related Art

In recent years, in a gasoline direct-injection engine system whose development has been advanced in an automobile industry for the purpose of reducing environmental load according to fuel consumption improvement a pipe for supplying fuel (gasoline) to a direct-injection rail of an engine from a fuel tank via a pump has been demanded to have pressure resistance and air tightness higher than those of an existing multi point injection engine (see Japanese Patent Application Laid-Open No. 2006-152852). Further, in a diesel engine system, a fuel injection apparatus having a configuration where an injector has been coupled to each cylinder of a high-pressure fuel pipe branched from a common fuel supply passage has been demanded to high pressure resistance and high air tightness to the high-pressure supply pipe (see Japanese Patent Application Laid-Open No. 2002-54354). In addition, a pipe having pressure resistance even to an internal combustion engine using fuel containing much corrosive component such as represented by alcoholic fuel derived from biological materials (hereinafter, referred to as "corrosive fuel") has been demanded.

Conveying pipes of fuel used in the gasoline direct-injection engine system and the diesel engine system as described above has most adopted products obtained by performing various plastic workings (such as pipe-end forming working, bending working) or joining working (such as brazing working) to a stainless material have been most adopted, as a specification having various properties, such as the above-described pressure resistance, air tightness, and corrosion resistance.

On one hand, for the existing multi point injection engine, a fuel conveying pipe adopting a steel pipe of inexpensive low-grade carbon steel or the like rather than the stainless pipe has been proposed (see Japanese Patent Application Laid-Open No. 2012-26357). Especially, for the purpose of obtaining high resistance to corrosive fuel, the steel fuel conveying pipe is applied with an inner surface treatment and/or an outer surface treatment excellent in resistance to corrosive fuel, including one where a Ni-plated layer has been formed on an inner surface of the steel pipe and an anti-rust film layer composed of a Zn-plated layer or a Zn-based alloy-plated layer has been further provided on the Ni-plated layer, and one where a Zn-plated layer or an Zn-based alloy-based plated layer has been further provided on an outer surface of the steel pipe.

However, in the conventional stainless pipe which has been applied with the plastic working or the joining working, there is such a concern as a stress corrosion cracking (SCC) during plastic working, intercrystalline corrosion or sensitization due to thermal influence during joining working (rising the degree of risk of occurrence of SCC), mechanical property (strength) lowering or the like. In the case of the steel pipe, it is thought that a burrier function is added by applying protection plating of Ni series, Cr series or the like more electrically excellent than steel of a base material, but it is necessary to adopt a film having a substantial film thickness/layer thickness (level of several tens μm) or change a plurality of films to a multilayer/alloy them in order to completely exclude a defect such as a pinhole which may cause corrosion, which results in increase of cost. Alternatively, it is thought to add a sacrifice anticorrosion by applying sacrifice plating of Zn series, Al series or the like electrically inferior to the steel of the base material, but there is such a concern that Zn or Al which is an anti-rust component is eluted in corrosive fuels as ions since the sacrifice plating has a sacrifice anticorrosion, so that the eluted ions raise various adverse effects at various sections of an internal combustion engine.

Further, for the steel fuel conveying pipe which has been applied with an inner surface treatment and/or an outer surface treatment excellent in resistance to corrosive fuels for the purpose of obtaining high resistance to corrosive fuels, for example, when a means of compensating for corrosion resistance inside the pipe with sacrifice anticorrosion of Zn plating adopted by elution of Zn which is an anti-rust component is suppressed up to extremity by forming a Ni-plated layer with a desired layer thickness on an inner surface of the pipe and applying Zn plating on an outer surface of the pipe to a portion of the inner surface of the pipe, there is such a problem that sacrifice anticorrosion will be lost when whole of the Zn plating is eluted. In addition, when non-electroplating of NiP has been used in the Ni-plated layer, because the NiP plating is generally a hard film, there is a possibility that a film crack occurs by working after the plating. Therefore, the non-electroplating of NiP must be performed after working to a product shape, cost increase is thus forced.

Incidentally, as a steel strip (including a steel plate) excellent in corrosion resistance and plating adhesion, a Ni-plated steel strip with high corrosion resistance where the Ni-plated layer has been partially or wholly formed as an Fe—Ni diffusion layer and an Fe exposure ratio in a surface layer has been set to 30% or less has been proposed (Japanese Patent Application Laid-Open No. H06-2104), but the Ni-plated steel strip with high corrosion resistance cannot be said to be sufficient as a material for a fuel conveying pipe which is a subject to be improved by the present invention because in a fuel conveying pipe where a cleanliness factor of an inner surface thereof is specified, rust is under more severe control.

The present invention has been made in view of the conventional problems, and it is to provide a steel fuel conveying pipe with a high quality having high resistance to corrosive fuel, having followability and allowing working after plating in a pipe for supplying fuel to an engine in a gasoline direct-injection engine system or a diesel engine system.

SUMMARY

A steel fuel conveying pipe according to the present invention is a steel fuel conveying pipe for conveying fuel from a high-pressure pump to a direct-injection rail in a gasoline direct-injection engine system or a diesel engine system, characterized in that the steel fuel conveying pipe is formed with a Ni-plated layer on an inner surface of a steel pipe of a base material, and the Ni-plated layer is wholly composed of a mutual diffusion layer including the base material and Ni (hereinafter, referred to as "diffusion layer" for convenience of explanation) and a non-mutual diffusion layer including only Ni formed on an outermost surface of the diffusion layer (hereinafter, referred to as "non-diffusion layer" for convenience of explanation), a layer thickness of the non-diffusion layer is 3 μm or more, and a total layer thickness of the diffusion layer and the non-diffusion layer is 10 μm or more and 25 μm or less. Further, it is a preferable aspect that the mutual diffusion layer and the non-mutual diffusion layer are applied up to a seal area at a terminal end of a connection head portion.

The present invention achieves an excellent advantageous effect that a fuel conveying pipe further excellent in anti-corrosion to corrosive fuel in a whole region of an inner surface of the pipe can be obtained and reliability of a gasoline direct-injection engine system or a diesel engine system can be largely improved by providing a Ni-plated layer composed of a diffusion layer having a base material and Ni, and a non-diffusion layer having only Ni formed on the outermost layer of the diffusion layer, a layer thickness of the non-diffusion layer being 3 μm or more and a total layer thickness of the diffusion layer and the non-diffusion layer being 10 μm or more and 25 μm or less, in the inner surface of the pipe, namely, a fuel flow passage region.

DETAILED DESCRIPTION

Figure 1:
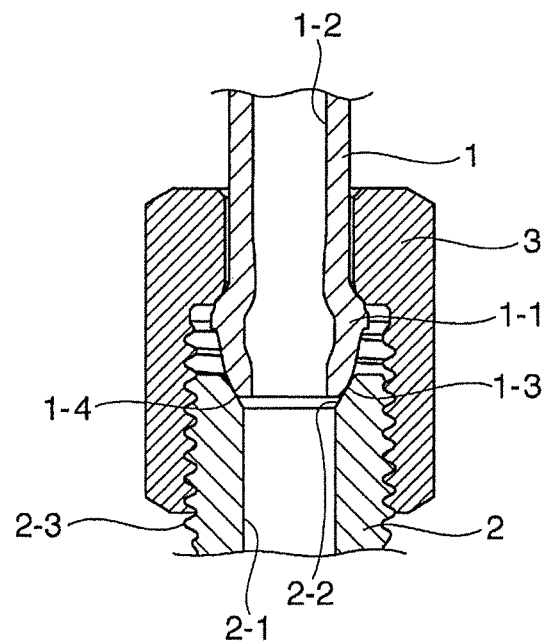
FIG. 1 is a sectional view of a main section showing an embodiment of a fuel conveying pipe of the present invention.

FIG. 1 exemplifies a connection structure of a fuel conveying pipe of the present invention, in which a fuel conveying pipe 1 that has a flow passage 1-2 at an axial center of the pipe and a connection head portion 1-1 formed with a pressing seat face 1-3 having a tapered, approximately conical and arc-shaped seat face 1-4 at a distal end thereof, contacts with a pressure-receiving face 2-2, that is opened outward in a conical shape, of a cylindrical mating part 2 having a through-hole 2-1 formed with the pressure-receiving face 2-2 and formed with a male screw 2-3 on an outer circumferential face thereof, and a male screw provided on the mating part 2 is screwed with a cap nut 3 assembled to the fuel conveying pipe 1 in advance, so that fastening is performed by pressing below a neck of the connection head portion 1-1 of the fuel conveying pipe 1.

For a steel pipe used as a base material of the fuel conveying pipe 1 of the present invention, it is preferable to employ a seamless pipe which can be expected to have proper high durability achieving further effective function and effect to corrosive fuel. Further, since the connection head portion 1-1 at an end of the fuel conveying pipe 1 is formed, for example, by buckling working, a welding step for joining working may be excluded. Therefore, it is possible to suppress a stress corrosion crack (SCC) during plastic working appearing in a conventional stainless pipe, and to prevent intercrystalline corrosion or sensitization due to thermal influence during joining working (rising the degree of risk of occurrence of SCC), and reduction of lowering of mechanical property (strength).

A Ni-plated layer 4 is provided on an inner surface of the above-described fuel conveying pipe 1, namely, in a fuel flow passage region including a seal region (such as a seat face 1-4) at a terminal end of the pipe, is composed of a diffusion layer (Fe—Ni) 4a formed of a pipe base material (Fe) 11 and Ni and a non-diffusion layer 4b formed of only Ni that is provided on an outermost surface of the diffusion layer 4a, as showing a section of the Ni-plated layer 4. A layer thickness of the non-diffusion layer is 3 μm or more, and a total layer thickness of the diffusion layer 4a and the non-diffusion layer 4b is 10 μm or more and 25 μm or less.

Here, the reason why the layer thickness of the non-diffusion layer 4b of only Ni formed on the outermost surface of the diffusion layer 4a is limited to 3 μm or more and the total layer thickness of the diffusion layer 4a and the non-diffusion layer 4b is limited to 10 μm or more and 25 μm or less, is that stress of the Ni plating is removed by thermal treatment so that followability to a worked portion is provided and a burrier function to corrosion attack to the pipe base material from corrosive fuel is maintained sufficiently. When the total layer thickness of the diffusion layer 4a and the non-diffusion layer 4b exceeds 25 μm, an effect meeting rising of a manufacturing cost cannot be obtained and there is further a possibility that since an inner diameter size of the pipe material is contracted, deviation from a size tolerance of the high-pressure fuel pipe occurs.

According to the present invention, even if the Zn plating of a fuel pipe obtained by applying the Zn plating applied to an outer surface of a pipe to a portion of an inner surface of the pipe is whole eluted by corrosive fuel, corrosion resistance is maintained by providing, on the inner surface of the pipe of the fuel conveying pipe 1, the Ni-plated layer composed of the diffusion layer 4a having the pipe base material 11 and Ni and the non-diffusion layer 4b having Ni only formed on the outermost surface of the diffusion layer 4a, the layer thickness of the non-diffusion layer 4b being 3 μm or more and the total layer thickness of the diffusion layer 4a and the non-diffusion layer 4b being 10 μm or more and 25 μm or less, as described above. In addition, while the diffusion layer 4a formed of the pipe base material and Ni has firm anchor effect owing to mutual diffusion between the pipe base material and Ni, the non-diffusion layer 4b is improved regarding its malleability and has followability because stress is removed by thermal treatment, so that film crack does not occur even in a worked portion of terminal end working, bending working or the like. Further, by applying the Ni-plated layer having a predetermined layer thickness and composed of the diffusion layer 4a and the non-diffusion layer 4b to a portion including the seal area at the terminal end of the pipe, the fuel conveying pipe can hold corrosion resistance to corrosive fuel without applying Zn plating.

EXAMPLE

The present invention will be explained below more specifically based upon examples. However, the present invention is not limited by the examples described below, and all of modifications and implementations of the invention in the scope which does not deviate from the gist of the present invention are involved in the technical scope of the present invention.

In the examples, an effect of the Ni-plated layer (an anti-rust film layer) which was applied to an inner face of the pipe was determined by performing corrosion test to corrosive fuel and observing a corrosion situation (corrosion resistance) visually and using a microscope.

Examples 1 to 9

Steel pipe materials having an outer diameter of 8 mm and an inner diameter of 5 mm (Test material Nos. 1 to 9) were used as pipe base materials, and a Ni-plated layer (a layer thickness was 10 μm or more and 25 μm or less) composed of a diffusion layer having a layer thickness of 0.6 to 19.6 μm and a non-diffusion layer having a layer thickness of 3.1 to 20.6 μm was formed on an inner surface of each pipe by conventional electroplating and thermal treatment.

A result obtained by performing measurement of layer thicknesses of the Ni-plated layers composed of the diffusion layer and the non-diffusion layer and formed on steel pipe materials in the examples, corrosiveness test and followability test (bending working test) thereof in the following procedure is shown in Table 1.

Measurement of Layer Thickness of Ni-Plated Layer:

The layer thickness of the Ni-plated layer composed of the diffusion layer and the non-diffusion layer was measured by linear analysis using a scanning electron microscope (Model 6510LA manufactured by JEOL) and an energy dispersive X-ray spectroscopy (Model JED-2300 manufactured by JEOL).

Corrosiveness Test:

Corroded conditions inside the pipe obtained by sealing corrosive fuel (20% of mixed with alcohol (gasoline) containing 500 ppm of organic acid (formic acid and acetic acid), 5% of water, and 10 ppm of chloride) into each of the steel pipe material having a whole inner face which was applied with Ni plating, and leaving the pipe at a temperature of 120° C. for 1000 hours were confirmed. Corrosion evaluation was determined by confirming presence/absence of red rust visually and a stereoscopic microscope.

Followability Test:

After bending working toward a U shape with R15 was applied to each steal pipe material having a whole inner face which was applied with Ni plating, crack situation of a film of a plated film at the bending-worked portion was observed using a scanning microscope.

Comparative Examples 1 to 4

Steel pipe materials having an outer diameter of 8 mm and an inner diameter of 5 mm similarly to those of examples 1 to 9 were used, and a Ni-plated layer composed of a diffusion layer having a layer thickness of 1.0 to 22.0 μm and a non-diffusion layer having a layer thickness of 1.9 to 6.0 μm was formed on an inner surface of each pipe by conventional electroplating and thermal treatment. Measurement of the layer thickness of the Ni-plated layers was performed by the same method as those of the above-described examples 1 to 9.

A result obtained by performing corrosiveness test and followability test (bending working test) of the Ni-plated layers composed of the diffusion layer and the non-diffusion layer and formed on steel pipe materials in the comparative examples in the same method as that of the above-described examples is also shown in Table 1.

Conventional Example 1

A result obtained by using a steel pipe material having an outer diameter of 8 mm and an inner diameter of 5 mm similarly to those of examples 1 to 9, forming only a non-diffusion layer having layer thickness of 7.0 μm on an inner surface of the pipe by conventional electroplating (without a non-diffusion layer), and performing a corrosiveness test and followability test (bending working test) in the same method as those of the above-described examples is also shown in Table 1. Measurement of the layer thickness of the Ni-plated layer was performed by the same method as those of the above-described examples 1 to 9.

Conventional Example 2

A result obtained by using a steel pipe material having an outer diameter of 8 mm and an inner diameter of 5 mm similarly to those of examples 1 to 9, forming only a non-diffusion layer having layer thickness of 7.5 μm on an inner surface of the pipe by conventional electroplating and thermal treatment (without a non-diffusion layer), and performing a corrosiveness test and followability test (bending work test) in the same method as that of the above-described examples is also shown in Table 1. Measurement of the layer thickness of the Ni-plated layer was performed by the same method as those of the above-described examples 1 to 9.

Conventional Example 3

A result of corrosiveness test and followability test (bending work test) of a stainless pipe material (made of SUS304) having an outer diameter of 8 mm and an inner diameter of 5 mm similarly to those of examples 1 to 9 is also shown in Table 1.

Conventional Example 4

A result obtained by using a steel pipe material having an outer diameter of 8 mm and an inner diameter of 5 mm similarly to those of examples 1 to 9, forming a non-diffusion layer having a layer thickness of 4.6 μm on an inner surface of the pipe by electroplating of NiP, and performing corrosiveness test and followability test (bending working test) of the pipe material where a portion of a terminal end inside the pipe was coated with Zn plating is also shown in Table 1.

From the result shown in Table 1, the following consideration can be performed.

(1) In the case of each of the steel pipe materials of the present invention of examples 1 to 9 formed on an inner surface of a pipe with the Ni-plated layer composed of the diffusion layer formed on the base material and Ni, and the non-diffusion layer formed on only Ni provided on the outermost surface of the diffusion layer, the layer thickness of the non-diffusion layer being 3 μm or more and the total layer thickness of the non-diffusion layer and the diffusion layer being 10 μm or more and 25 μm or less, followability appeared even in a worked portion since stress of the Ni plating could be removed by thermal treatment, and antirusty performance to corrosive fuel was maintained sufficiently thanks to the non-diffusion layer having a thickness of 3.0 μm or more and the total of the non-diffusion layer and the diffusion layer having a thickness of 10 μm or more, so that occurrence of rust in both the non-worked portion and the worked portion cannot appear and the steel pipe material is apparently excellent in followability and corrosion resistance.

(2) In the case of the pipe material (having the layer thickness of 2.1 μm) of the comparative example 1 where the layer thickness of the non-diffusion layer deviated from the specified value of the present invention, the corrosion resistance is poorer than those of examples 1 to 9 of the present invention since the layer film was a thin film as apparent from the result of the corrosiveness test, although the followability was not problematic. Thus, adoption as the fuel conveying pipe is difficult.

(3) In the case of the pipe material (having the total layer thickness of 28.0 μm) of the comparative example 2 where the total layer thickness of the non-diffusion layer of Ni and the diffusion layer deviated from the specified value of the present invention, an inner diameter of the pipe material is reduced when the total layer thickness of the non-diffusion layer of Ni and the diffusion layer exceeds 25 μm as described above, although the followability appeared even in the worked portion, and anti-rusty performance to corrosive fuel was maintained sufficiently, so that occurrence of red rust does not appear in the non-worked portion and the worked portion. Thus adoption as the fuel conveying pipe is also difficult.

(4) In the case of the pipe material (having the layer thickness of 1.9 μm) of the comparative example 3 where the layer thickness of the non-diffusion layer deviated from the specified value of the present invention, the corrosion resistance is poorer than those of examples 1 to 9 of the present invention since the layer film is a thin film as apparent from the result of the corrosiveness test, although the followability is not problematic, similarly to the comparative example 1. Thus adoption as the fuel conveying pipe is difficult.

(5) In the case of the pipe material (having the total layer thickness of 5.5 μm) of the comparative example 4 where the total layer thickness of the non-diffusion layer of Ni and the diffusion layer thereof deviated from the specified value of the present invention, the corrosion resistance is poorer than those of examples 1 to 9 of the present invention since the layer film is a thin film as apparent from the result of the corrosiveness test, although the followability is not problematic. Thus adoption as the fuel conveying pipe is difficult.

(6) In the case of the conventional example 1, since the thermal treatment was not performed, a diffusion layer appeared, and since stress of Ni plating could not be removed, a crack of the layer film was confirmed in the followability test, and further occurrence of rust was confirmed in the worked portion where the crack of the layer film was confirmed in the corrosiveness test. It is thus apparent that the conventional example 1 is poorer in quality than the surface-treated pipe material of the present invention.

(7) In the case of the conventional example 2, occurrence of rust appeared on the surface layer beginning at Fe since Fe was diffused up to a surface layer so that the no diffusion layer was present, although stress of the Ni plating could be removed by thermal treatment and therefore no cracking of the layer film appeared in the working which was performed after plating. It is thus apparent that the conventional example 2 is poorer in quality than the surface-treated pipe material of the present invention.

(8) In the case of the conventional example 3 where the stainless steel was used in the base material pipe material, occurrence of rust appeared in both the worked portion and the non-worked portion in the corrosiveness test, so that it cannot be said that the conventional example 3 is sufficient regarding quality as the fuel conveying pipe.

(9) In the case of the conventional example 4, since it is known that a non-electroplating of NiP does not have followability generally, corrosiveness test was performed to the pipe material which was applied with non-electroplating of NiP after the pipe material was worked. Therefore, a crack of the plating due to the working did not appear and occurrence of rust was not confirmed even in the corrosiveness test. However, occurrence of white rust (corrosion of Zn plating) appeared significantly. It is thought that in the case of the non-electroplating of NiP, a layer thickness (a film thickness) of the level of several tens μm is required to completely exclude a defect such as a pinhole, but though a thin film having a layer thickness of 4.6 μm is present in the conventional example 4, the corrosion resistance within the pipe was supplemented by the sacrifice anticorrosion of the Zn plating by applying the Zn plating to a portion of an inner surface of the pipe. Incidentally, in this example 4, since after bending working, plating treatment was performed to the bent portion, the followability test and the corrosiveness test of the bent portion were not implemented.

TABLE 1

| Test material No. | | Material | Film on inner surface | Layer thickness (μm) | | | Result of followability test | Result of corrosiveness test | |
| --- | --- | --- | --- | --- | --- | --- | --- | --- | --- |
| | | | | Non-diffusion layer | Diffusion layer | Non-diffusion layer + diffusion layer | | straight pipe portion (non-worked portion) | Bent portion (worked portion) |
| Present Invention | 1 | Steel | Electro plating of Ni | 4.6 | 8.0 | 12.6 | ○ | ○ | ○ |
| | 2 | Steel | Electro plating of Ni | 5.0 | 12.5 | 17.5 | ○ | ○ | ○ |
| | 3 | Steel | Electro plating of Ni | 3.1 | 7.4 | 10.5 | ○ | ○ | ○ |
| | 4 | Steel | Electro plating of Ni | 3.6 | 10.3 | 13.9 | ○ | ○ | ○ |
| | 5 | Steel | Electro plating of Ni | 7.0 | 7.9 | 14.9 | ○ | ○ | ○ |
| | 6 | Steel | Electro plating of Ni | 9.6 | 0.6 | 10.2 | ○ | ○ | ○ |
| | 7 | Steel | Electro plating of Ni | 20.6 | 2.5 | 23.1 | ○ | ○ | ○ |
| | 8 | Steel | Electro plating of Ni | 16.3 | 8.5 | 24.8 | ○ | ○ | ○ |

TABLE 1-continued

| Test material No. | | Material | Film on inner surface | Layer thickness (μm) | | | Result of followability test | Result of corrosiveness test | |
|---|---|---|---|---|---|---|---|---|---|
| | | | | Non-diffusion layer | Diffusion layer | Non-diffusion layer + diffusion layer | | straight pipe portion (non-worked portion) | Bent portion (worked portion) |
| | 9 | Steel | Electro plating of Ni | 4.6 | 19.6 | 24.2 | ○ | ○ | ○ |
| Comparative Example | 1 | Steel | Electro plating of Ni | 2.1 | 2.0 | 4.1 | ○ | Δ | Δ |
| | 2 | Steel | Electro plating of Ni | 6.0 | 22.0 | 28.0 | ○ | ○ | ○ |
| | 3 | Steel | Electro plating of Ni | 1.9 | 15.8 | 17.7 | ○ | Δ | Δ |
| | 4 | Steel | Electro plating of Ni | 4.5 | 1.0 | 5.5 | ○ | Δ | Δ |
| Conventional Example | 1 | Steel | Electro plating of Ni | 7.0 | 0.0 | 7.0 | X | ○ | X |
| | 2 | Steel | Electro plating of Ni | 0.0 | 7.5 | 7.5 | ○ | Δ | Δ |
| | 3 | SUS304 | — | — | — | — | ○ | Δ | Δ |
| | 4 | Steel | Non-electro plating of NiP + Terminal End of Zn | 4.6 | 0.0 | 4.6 | — | ○ | — |

Result of followability test,
○: absence of film crack,
X: presence of film crack
Result of corrosiveness test,
○: absence of red rust occurrence,
Δ: slight presence of red rust occurrence,
X: presence of red rust occurrence Example 10

Figure 2:
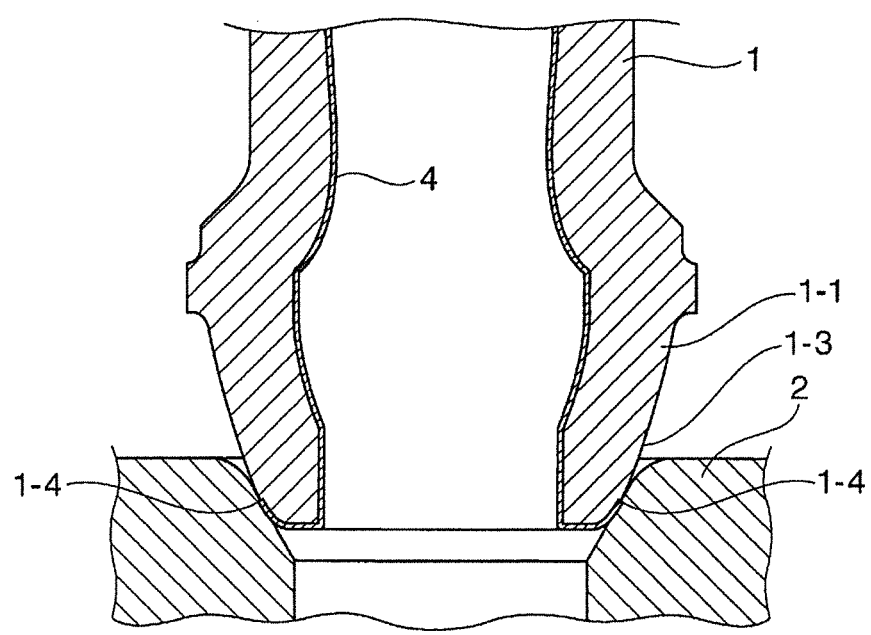
FIG. 2 is a sectional view showing the main section of the fuel conveying pipe shown in FIG. 1 in an enlarged manner.
Figure 3:
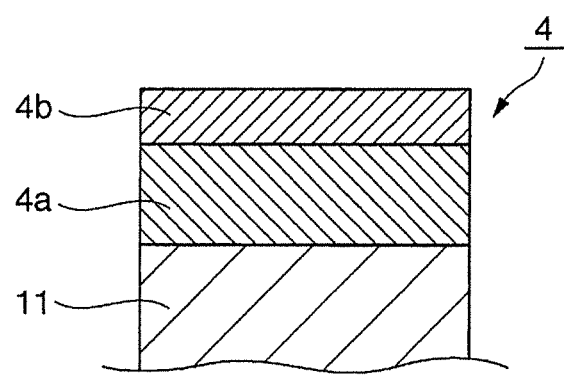
FIG. 3 is an illustrative sectional view showing a Ni-plated layer of the fuel conveying pipe shown in FIG. 1 in an enlarged manner.

For the purpose of examining an effect of anti-rust film layer which was applied to an inner surface, in particular, to a seal portion at a terminal end of the pipe, the fuel conveying pipe shown in FIG. 1 and FIG. 2, a steel pipe material having an outer diameter of 8 mm and an inner diameter of 5 mm and having a connection head portion similar to one shown in FIG. 1 and FIG. 2 was used, and a Ni-plated layer (having a total layer thickness of 14.8 μm composed of a non-diffusion layer having a layer thickness of 7.3 μm and a diffusion layer having a layer thickness of 7.5 μm was formed by conventional electroplating and thermal treatment. At this time, the whole fuel flow passage region was covered with the Ni plating by applying the Ni-plated layer where the non-diffusion layer having a layer thickness of 7.3 μm and a diffusion layer having a layer thickness of 7.5 μm were present to the seal portion. Regarding the steel pipe material, a result of corrosiveness test which was performed in a procedure similar to those of the above-described examples 1 to 9 is shown in Table 2.

As apparent from the result of the corrosiveness test shown in Table 2, occurrence of red rust did not appear even in this example.

Comparative Example 5

A steel pipe material similarly to that of example 10 was used, and regarding the steel pipe covered with a Ni-plated layer (having a total layer thickness of 14.5 μm) composed of a non-diffusion layer having a layer thickness of 6.9 μm and a diffusion layer having a layer thickness of 7.6 μm up to an end portion of an inner surface thereof except for a seal area at the terminal end of the pipe, a result of corrosiveness test which was performed according to a procedure similar to those in the above-described examples 1 to 9 is also shown in Table 2.

In this comparative example, since the Ni-plated layer composed of the non-diffusion layer having a layer thickness of 6.9 μm and the diffusion layer having a layer thickness of 7.6 μm was not applied up to the seal area at the terminal end of the pipe so that the steel pipe was only covered with the Ni-plated layer up to the end portion of the inner surface of the steel pipe, occurrence of red rust did not appear on a portion which was applied with the Ni-plated layer but occurrence of red rust was confirmed on the seal area at the terminal end of the pipe in the corrosiveness test.

TABLE 2

| Test material No. | | Material | Coating film on inner surface | Covering range of Ni layer | Layer thickness (μm) | | | Result of corrosiveness test |
| --- | --- | --- | --- | --- | --- | --- | --- | --- |
| | | | | | Non-diffusion layer | Diffusion layer | Non-diffusion layer + diffusion layer | (terminal end of inner surface~seal area) |
| Present Invention | 10 | Steel | Electroplating of Ni | Up to seal area of connection head portion | 7.3 | 7.5 | 14.8 | ○ |
| Comparative Example | 5 | Steel | Electroplating of Ni | Up to end portion of inner surface of connection head portion | 6.9 | 7.6 | 14.5 | X |

○: Absence of red rust occurrence,
X: presence of red rust occurrence

REFERENCE SIGNS LIST

1 . . . fuel conveying pipe
1-1 . . . connection head portion
1-2 . . . flow passage
1-3 . . . pressing seat face
1-4 . . . seat face
2 . . . mating part
2-1 . . . through-hole
2-2 . . . pressure-receiving seat face
2-3 . . . male screw
3 . . . cap nut
4 . . . Ni-plated layer
4a . . . diffusion layer
4b . . . non-diffusion layer
11 . . . pipe base material

The invention claimed is:

1. A steel fuel conveying pipe comprising a Ni-plated layer formed by electroplating on an inner surface of a steel pipe of a base material,
wherein the Ni-plated layer is composed of a mutual diffusion layer including the base material and Ni and a non-mutual diffusion layer including only Ni provided on an outermost surface of the mutual diffusion layer, and a layer thickness of the non-mutual diffusion layer is 3 μm or more, and a total layer thickness of the mutual diffusion layer and the non-mutual diffusion layer is 10 μm to 25 μm, and
wherein the Ni-plated layer composed of the mutual diffusion layer and the non-mutual diffusion layer is applied up to a seal area at a terminal end of a connection head portion.

2. A steel fuel conveying pipe having opposite inner and outer surfaces and a terminal end extending between the inner and outer surfaces, a connection head being formed adjacent the terminal end, the outer surface of the pipe at the connection head having a convex tapered seal area adjacent the terminal end, the fuel conveying pipe comprising:
a steel base material; and
an electroplated Ni layer formed on the steel base material at the inner surface of the pipe, the terminal end of the pipe and the convex tapered seal area, the Ni-plated layer being composed of a mutual diffusion layer that includes the base material and Ni and a non-mutual diffusion layer including only Ni provided on an outermost surface of the mutual diffusion layer, a layer thickness of the non-mutual diffusion layer being 3 μm or more, and a total layer thickness of the Ni-plated layer being 10 μm to 25 μm.

* * * * *